US012649449B2

(12) United States Patent
Nam et al.

(10) Patent No.: US 12,649,449 B2
(45) Date of Patent: Jun. 9, 2026

(54) BRAKING APPARATUS AND BRAKING METHOD FOR VEHICLE

(71) Applicants: Hyundai Motor Company, Seoul (KR); Kia Corporation, Seoul (KR)

(72) Inventors: Youn Sic Nam, Daejeon (KR); Seung Hyeon Cho, Hwaseong (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 82 days.

(21) Appl. No.: 18/416,619

(22) Filed: Jan. 18, 2024

(65) Prior Publication Data

US 2025/0115220 A1      Apr. 10, 2025

(30) Foreign Application Priority Data

Oct. 4, 2023      (KR) ........................ 10-2023-0131554

(51) Int. Cl.
B60T 8/172      (2006.01)
B60T 8/171      (2006.01)
B60T 8/32      (2006.01)
B60T 8/58      (2006.01)

(52) U.S. Cl.
CPC .............. B60T 8/172 (2013.01); B60T 8/171 (2013.01); B60T 8/321 (2013.01); B60T 8/58 (2013.01); *B60T 2220/04* (2013.01); *B60T 2250/04* (2013.01)

(58) Field of Classification Search
CPC .......... B60T 8/172; B60T 8/171; B60T 8/321; B60T 8/58; B60T 2220/04; B60T 2250/04
See application file for complete search history.

(56) References Cited

U.S. PATENT DOCUMENTS

| | | | | |
|---|---|---|---|---|
| 2020/0384967 A1 * | 12/2020 | Hiraga | .................... | B60T 8/245 |
| 2021/0079963 A1 | 3/2021 | Wu | | |
| 2022/0118957 A1 * | 4/2022 | Miyake | ................. | B60T 13/662 |
| 2023/0055919 A1 | 2/2023 | Yoo | | |

FOREIGN PATENT DOCUMENTS

| | | | | | |
|---|---|---|---|---|---|
| CN | 105711569 B | * | 4/2019 | ................ | B60T 8/17 |
| CN | 107878436 B | * | 9/2021 | ............ | B60T 13/662 |
| KR | 10-2023-0027342 A | | 2/2023 | | |
| KR | 10-2514339 B1 | | 3/2023 | | |

OTHER PUBLICATIONS

Machine Translation of CN 107878436 B PDF File Name: "CN 107878436B_Machine_Translation.pdf" (Year: 2021).*
Machine Translation of CN 105711569 B PDF File Name: "CN105711569B_Machine_Translation.pdf" (Year: 2019).*

* cited by examiner

*Primary Examiner* — Grant Moubry
*Assistant Examiner* — Ruben Picon-Feliciano
(74) *Attorney, Agent, or Firm* — Fox Rothschild LLP

(57) ABSTRACT

A braking apparatus for a vehicle may include a receiving unit for receiving driving information of the vehicle, a braking force generating unit for generating a braking force of the vehicle, and a continuous braking control unit for controlling the braking force generating unit based on the driving information to adjust a magnitude of the braking force, where the continuous braking control unit may control the braking force generating unit so as to periodically generate the braking force with the magnitude of between a first braking force and a second braking force.

17 Claims, 11 Drawing Sheets

BRAKING APPARATUS AND BRAKING METHOD FOR VEHICLE

CROSS-REFERENCE TO RELATED APPLICATION(S)

This application claims under 35 U.S.C. § 119 (a) the benefit of Korean Patent Application No. 10-2023-0131554 filed on Oct. 4, 2023 in the Korean Intellectual Property Office, the entire contents of which are incorporated herein by reference.

BACKGROUND

(a) Technical Field

The present disclosure relates to a braking apparatus and a braking method for a vehicle, more particularly, to the braking apparatus and the braking method for performing continuous braking control in which a braking force may be adjusted so that a driving speed changes continuously until the vehicle stops.

(b) Description of the Related Art

A braking apparatus is an apparatus for reducing a vehicle speed or stopping a vehicle, while driving, and is of utmost importance to vehicle safety. A vehicle braking apparatus is an apparatus converting rotational energy of wheels into heat energy using frictional force to reduce the vehicle speed and stop the vehicle.

When stopping a vehicle, even if vehicle speed changes from 1 kilometer per hour (kph) to 0 (zero) kph, for example, as vehicle speed changes discontinuously, a braking impact due to inertia may occur in the vehicle.

In particular, relative motion occurs between a vehicle and a person riding in the vehicle, and in particular, for the person riding in the vehicle, the greatest inertial force acts on the head, which has the greatest weight in the body, causing the vehicle to move forward, worsening riding comfort within the vehicle when stopped.

SUMMARY

An aspect of the present disclosure is to provide a braking apparatus and a braking method that can minimize an impact occurring when a vehicle is stopped by linearly changing a driving speed of the vehicle to stop the vehicle.

According to an aspect of the present disclosure, a braking apparatus may include: a receiving unit configured to receive vehicle driving information, a braking force generating unit configured to generate a braking force of the vehicle, and a continuous braking control unit configured to control the braking force generating unit to adjust a magnitude of the braking force based on the driving information, where the continuous braking control unit may control the braking force generating unit so as to periodically generate the braking force with the magnitude of between a first braking force and a second braking force.

The continuous braking control unit may generate braking force so that a driving speed of the vehicle continuously changes.

The first braking force may be a highest braking force value within one cycle, and the second braking force may be a lowest braking force value within the one cycle.

The driving information may include at least one of a driving speed of the vehicle or brake pedal stroke information.

Based on the driving information, a continuous braking initiation determination unit determining whether the continuous braking control unit initiates continuous braking may be included.

When in the continuous braking initiation determination unit, vehicle driving speed is lower than a preset first reference speed and a brake pedal is in operation, the continuous braking control unit may control the braking force generating unit.

The continuous braking control unit may include a first continuous braking control mode which brakes to reduce vehicle speed to a preset speed based on vehicle driving speed and a second continuous braking control mode which brakes to stop the vehicle.

At least one of the first continuous braking control mode and the second continuous braking control mode may include determining a plurality of continuous braking control sections divided based on vehicle driving speed.

In at least one continuous braking control section among the plurality of continuous braking control sections, the continuous braking control unit may control the braking force generating unit to maintain the first braking force to be constant in each cycle, but to gradually reduce the second braking force in each cycle.

In another continuous braking control section among the plurality of continuous braking control sections, the continuous braking control unit may control the braking force generating unit to maintain the first braking force and the second braking force in each cycle to be constant.

In another continuous braking control section among the plurality of continuous braking control sections, the continuous braking control unit may control the braking force generating unit to maintain the second braking force to be constant in each cycle, but to gradually reduce the first braking force in each cycle.

A vehicle may include the braking apparatus.

According to another aspect of the present disclosure, a braking method may include steps of: receiving, by a receiving unit of a braking apparatus, vehicle driving information; determining by a continuous braking control unit of the braking apparatus, whether to initiate continuous braking control based on the driving information; and performing, by the continuous braking control unit, continuous braking control by adjusting braking force, where in the step of performing continuous braking control, the braking force may be adjusted so that driving speed changes continuously until the vehicle stops.

In the step of determining whether to initiate continuous braking control, when vehicle driving speed is lower than a preset speed, the continuous braking control may be initiated.

In the step of performing continuous braking control, the braking force may periodically generate a first braking force and a second braking force, and the braking force may be controlled to form a waveform, thereby controlling the braking force so that the driving speed changes continuously.

The first braking force may be the highest braking force value within one cycle, and the second braking force may be the lowest braking force value within one cycle.

The first braking force may be the highest braking force value within one cycle, and the second braking force may be the lowest braking force value within one cycle.

In the at least one continuous braking control section, the step of performing continuous braking control may generate braking force to maintain the first braking force to be constant, but to gradually increase an amplitude of the waveform.

In the at least one continuous braking control section, the step of performing continuous braking control may generate braking force to maintain the amplitude of the waveform to be constant.

In the at least one continuous braking control section, the step of performing continuous braking control may generate braking force to maintain the second braking force to be constant, but to gradually reduce the amplitude of the waveform.

BRIEF DESCRIPTION OF DRAWINGS

The above and other aspects, features, and advantages of the present disclosure will be more clearly understood from the following detailed description, taken in conjunction with the accompanying lead-outs, in which.

DETAILED DESCRIPTION

Figure 1:
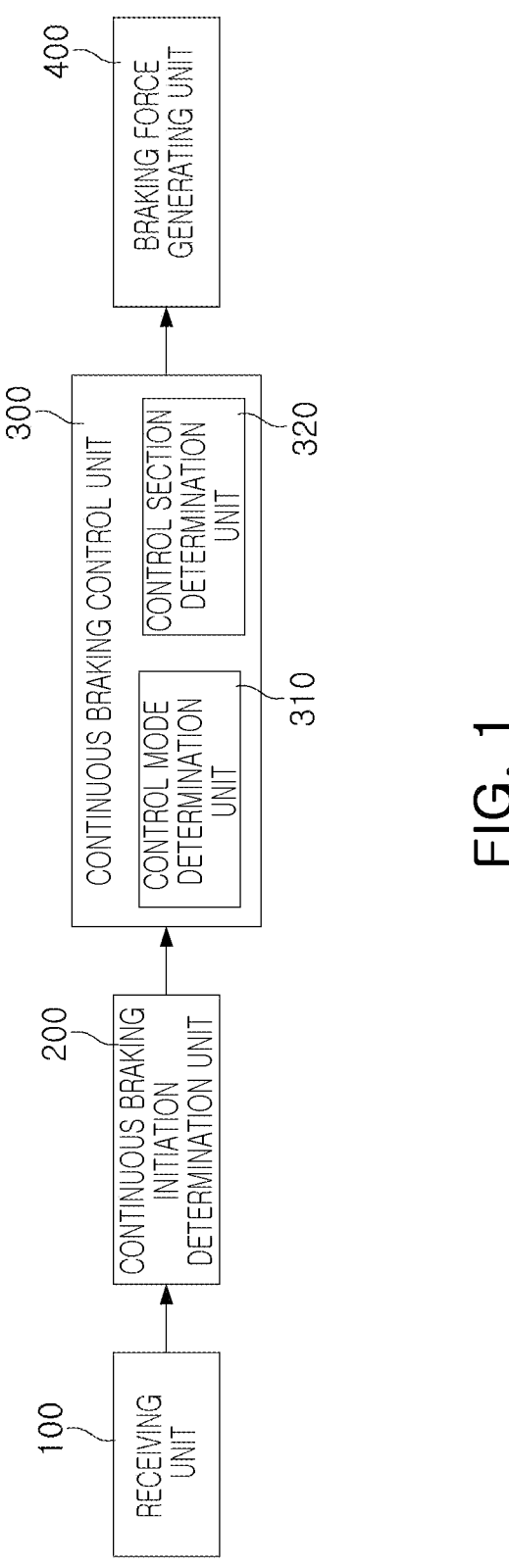
FIG. 1 is a block diagram of a braking apparatus according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Since the present disclosure may have various changes and may have various exemplary embodiments of the present disclosure, specific embodiments may be illustrated in the drawings and described in detail. However, this is not intended to limit the present disclosure to specific embodiments, it should be understood to include all modifications, equivalents, and substitutes included in the spirit and scope of the present disclosure.

Unless defined otherwise, all terms used herein, including technical or scientific terms, have the same meaning as that which can commonly understood by one of ordinary skill in the art to which the present disclosure belongs. Terms such as those defined in a commonly used dictionary should be interpreted as having a meaning consistent with the meaning in the context of the related art, and should not be interpreted in an ideal or excessively formal manner unless explicitly defined in the present application.

Hereinafter, preferred embodiments of the present disclosure will be described in more detail with reference to the accompanying drawings.

In the present disclosure, continuous braking is braking that changes braking force and slows down or stops a vehicle according to an embodiment of the present disclosure, and may be braking that can improve riding comfort of a person riding in a vehicle by minimizing an effect of inertial force occurring when the vehicle is stopped.

FIG. 1 is a block diagram of a braking apparatus according to an embodiment of the present disclosure.

Referring to FIG. 1, the braking apparatus according to an embodiment of the present disclosure may include a receiving unit 100, a continuous braking initiation determination unit 200, a continuous braking control unit 300, and a braking force generating unit 400.

Each of the above units may constitute modules and/or devices of the braking apparatus, which may be a controller.

For example, the above units of the braking apparatus may constitute hardware components that form part of a controller (e.g., modules or devices of a high-level controller), or may constitute individual controllers each having a processor and memory. The braking apparatus may include one or more processors and memory.

The receiving unit 100 may receive information on driving conditions of the vehicle.

For example, the receiving unit 100 may receive information on driving conditions, including whether a driver operates a brake pedal, vehicle driving speed, brake hydraulic pressure, and required braking torque, and the like.

Here, the required braking torque may be a braking torque that can satisfy required deceleration set according to vehicle driving speed based on a degree of stroke of a brake pedal operated by a driver.

The required braking torque can be set in various manners, based on an adjustment amount of the brake pedal (for example, a degree of stroke of the brake pedal, a speed of change of the stroke of the brake pedal, or a magnitude of pedal force) for each vehicle or user setting.

However, the present disclosure is not limited thereto, and the receiving unit 100 may receive driving information capable of estimating driving conditions, including whether a brake pedal is in operation, vehicle driving speed, braking hydraulic pressure, and braking torque.

For example, the receiver 100 may further include driving information such as stroke degree information of the vehicle's brake pedal, a wheel speed of each wheel, and the like.

Here, whether the driver operates the brake pedal can be estimated through brake pedal stroke information, and vehicle driving speed can also be estimated through the wheel speed of each wheel.

In addition, the receiving unit 100 can be connected to sensors provided in the vehicle using a network provided in the vehicle and receive information regarding a driving condition of the vehicle.

For example, the receiving unit 100 may receive brake pedal state information including brake pedal stroke information from a brake pedal sensor using a vehicle's controller area network (CAN) of the vehicle, and may determine whether the brake pedal is in operation by monitoring the received degree of stroke of the brake pedal.

In addition, the receiving unit 100 may receive required deceleration using a vehicle's controller area network (CAN) network, or receive brake pedal state information including brake pedal stroke information from a brake pedal sensor. The continuous braking control unit 300 may determine required deceleration or required braking force based on the degree of stroke of the brake pedal received through the receiving unit 100.

The continuous braking initiation determination unit 200 may determine whether to initiate continuous braking based on the driving information received from the receiving unit 100.

For example, the continuous braking initiation determination unit 200 may determine whether to initiate continuous braking based on a driver's intention to decelerate. The driver's intention to decelerate may be determined based on vehicle driving speed and whether a driver operates a brake.

More specifically, the continuous braking initiation determination unit 200 may compare vehicle driving speed received from the receiving unit 100 with a preset first reference speed (for example, 10 kph (kilometer per hour)).

The continuous braking initiation determination unit 200 may initiate continuous braking control when vehicle driving speed is lower than a preset first reference speed.

In addition, the continuous braking initiation determination unit 200 may determine whether a brake pedal is in operation from the receiving unit 100, and may initiate continuous braking control when the brake pedal is in operation.

Here, the continuous braking initiation determination unit 200 may determine whether the brake is operating through a brake pedal pressure sensor or a stroke sensor.

The braking force generating unit 400 may be a device generating braking force. For example, the braking force generating unit 400 may be a hydraulic braking apparatus. In this case, the braking force generating unit 400 may control the braking force by adjusting the braking hydraulic pressure applied to the hydraulic braking apparatus.

However, the braking force generating unit 400 is not limited to a hydraulic braking apparatus, and various braking apparatuses capable of generating braking force, such as an electro-mechanical brake (EMB), an electronic parking brake (EPB), or the like may be applied.

The continuous braking control unit 300 may control the braking force generating unit 400 to generate braking force.

The continuous braking control unit 300 may control the braking force generated by the braking force generating unit 400 in at least two continuous braking control modes.

The continuous braking control unit 300 may include a control mode determination unit 310 and a control section determination unit 320.

The control mode determination unit 310 may control the braking force generating unit 400 in at least two control modes including a first continuous braking control mode and a second continuous braking control mode based on vehicle driving speed.

Each of the first continuous braking control mode and the second continuous braking control mode may include a plurality of continuous braking control sections.

The first continuous braking control mode, the second continuous braking control mode, and each continuous braking control section may be determined based on vehicle driving speed.

The braking apparatus according to an embodiment of the present disclosure may be divided into a first continuous braking control mode and a second continuous braking control mode, control the braking force of the vehicle, decelerate the vehicle and stop the vehicle, thereby minimizing inertial force occurring when the vehicle stops, thereby improving riding comfort of passengers.

The control mode determination unit 310 may determine the continuous braking control mode of the vehicle based on vehicle driving speed. In addition, the control section determination unit 320 may determine a continuous braking control section in the continuous braking control mode determined based on vehicle driving speed.

A detailed description of the continuous braking control mode and continuous braking control section will be described later.

The continuous braking control unit 300 may be implemented through a non-volatile memory (not shown) configured to store data regarding an algorithm configured to control operations of various components of a vehicle or software instructions for reproducing the algorithm, and a processor (not shown) configured to perform the operations described below using data stored in the memory.

Here, the memory and processor may be implemented as individual chips. Alternatively, the memory and processor may be implemented as a single chip integrated with each other. A processor may have a form of one or more processors.

The components of the braking system may be connected wired and wirelessly to exchange information. For example, data may be exchanged using communication means such as Ethernet, Media Oriented Systems Transport (MOST), Flexray, Controller Area Network (CAN), Local Interconnect Network (LIN), Internet, LTE, 5G, Wi-Fi, Bluetooth, Near Field Communication, Zigbee, Radio Frequency, or the like.

Figure 2:
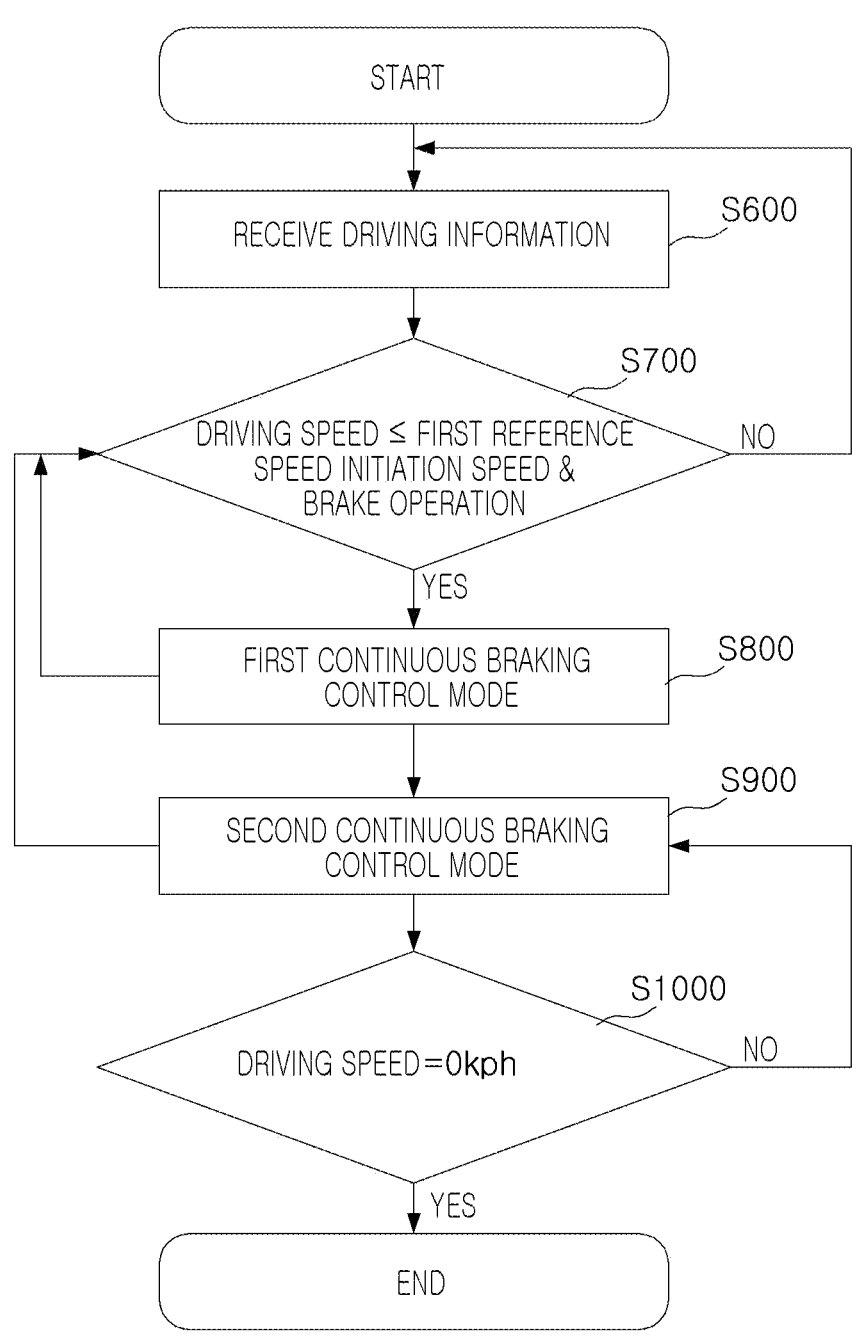
FIG. 2 is a flowchart of a braking method according to an embodiment of the present disclosure.
Figure 3:
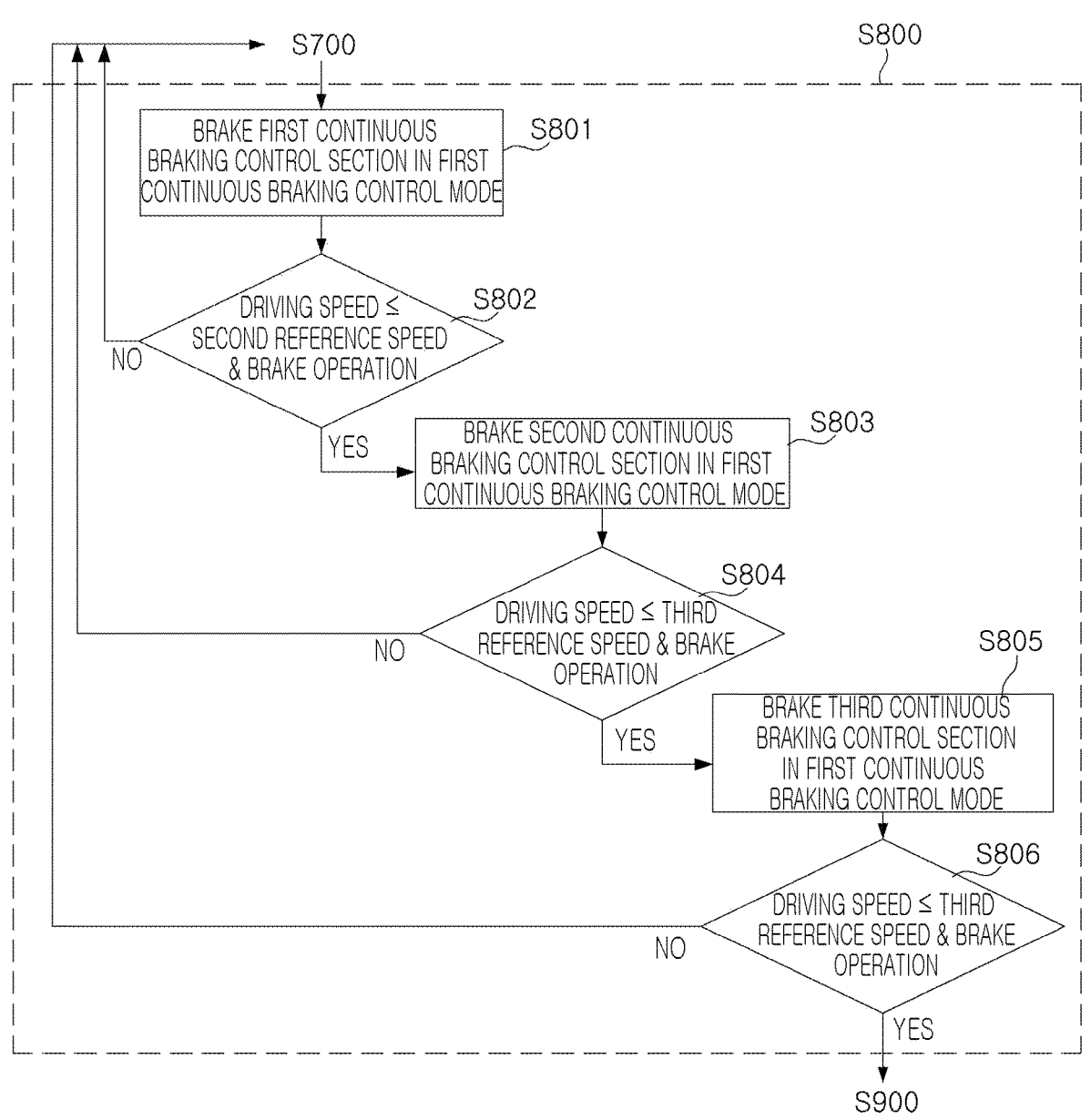
FIG. 3 is a detailed flowchart of S800 according to an embodiment of the present disclosure.
Figure 4:
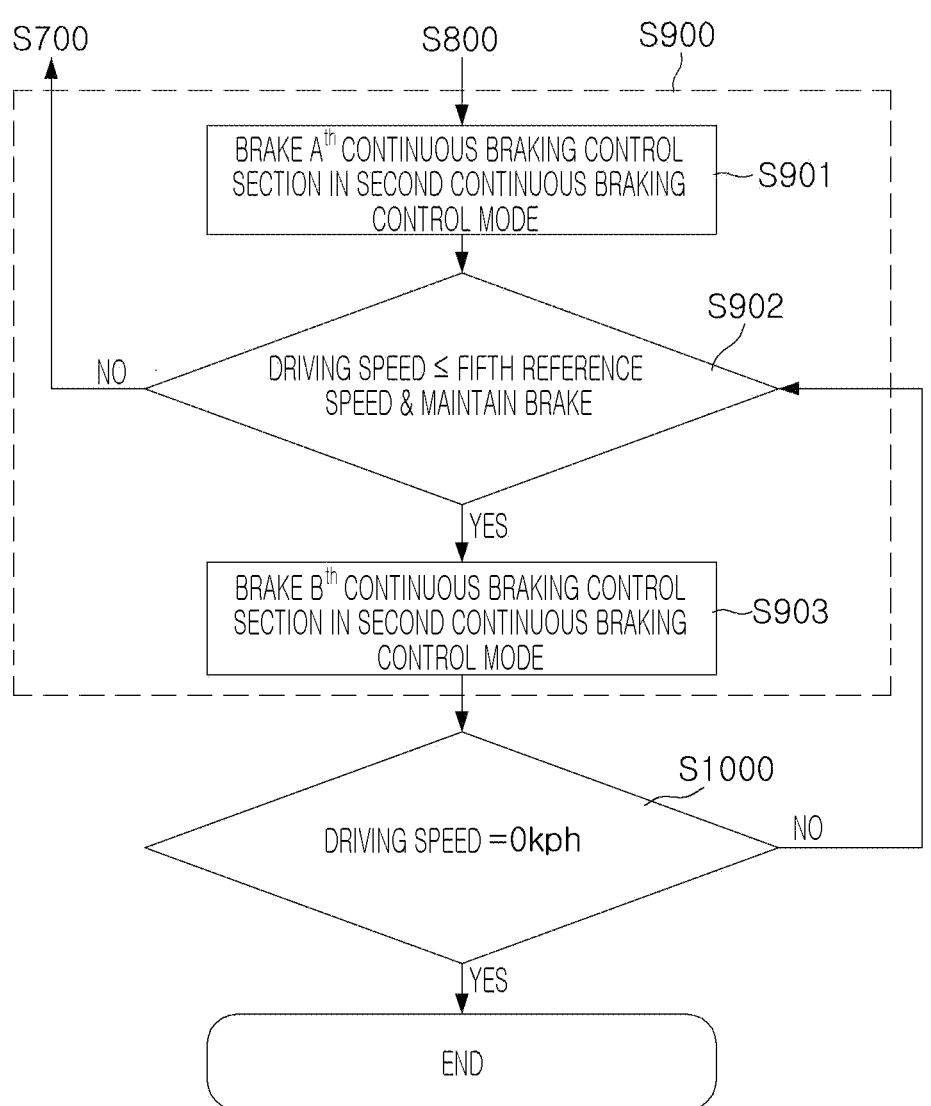
FIG. 4 is a detailed flowchart of S900 according to an embodiment of the present disclosure.

FIG. 2 is a flowchart of a braking method according to an embodiment of the present disclosure, FIG. 3 is a detailed flowchart of S800 according to an embodiment of the present disclosure, and FIG. 4 is a detailed flowchart of S900 according to an embodiment of the present disclosure.

Referring to FIG. 2, the braking method according to an embodiment of the present disclosure may receive driving information through the receiving unit 100 while a vehicle is driving (S600).

The continuous braking initiation determination unit 200 may determine whether to initiate continuous braking control based on information received through the receiving unit 100 (S700). The continuous braking initiation determination unit 200 may determine whether to initiate continuous braking control based on vehicle driving speed and whether a brake is in operation.

More specifically, in the continuous braking initiation determination unit 200, the vehicle driving speed received from the receiving unit 100 is lower than a first reference speed (for example, 10 kph), which is preset and stored, and a driver operates a brake pedal, the continuous braking initiation determination unit 200 may determine to initiate continuous braking control.

Here, whether the driver operates a brake pedal may be confirmed by receiving brake pedal stroke information, brake pedal effort information, or the like provided on the brake pedal through the receiving unit 100.

In other words, the continuous braking initiation determination unit 200 can confirm a driver's intention to brake based on vehicle driving speed and whether the brake pedal is operating.

When the continuous braking initiation determination unit 200 determines to initiate continuous braking, the continuous braking control unit 300 may control the braking force generating unit 400, including a first continuous braking control mode and a second continuous braking control mode (S800 and S900).

In the case of the prior art, when the driver operates a brake pedal, by generating a certain required braking force determined based on stroke or pedal force of the brake pedal, to stop the vehicle, an impact occurring when a vehicle is stopped due to inertial force may occur, at the moment at which the vehicle is stopped while vehicle speed is 0 kh/h.

In particular, in the case of people riding in a vehicle, there may be a problem that a feeling of stopping is deteriorated as a phenomenon in which a head, the heaviest part of the body, moves forward due to inertia.

The continuous braking control unit 300 may not generate braking force consistently using required braking force determined based on the stroke of the brake pedal or the pedal force of the brake pedal, but repeatedly change the magnitude of the braking force based on the driving speed to smoothly stop the vehicle.

More specifically, the continuous braking control unit 300 may include a plurality of methods for changing the magnitude of the braking force, and may generate braking force by applying an appropriate barking method to each of a plurality of sections divided based on the driving speed, thereby minimizing the shock that occurs when braking and stopping.

When the continuous braking initiation determination unit 200 determines to initiate continuous braking, the continuous braking control unit 300 may perform a first continuous braking control mode (S800).

Referring to FIG. 3, the first continuous braking control mode may include a first continuous braking control section, a second continuous braking control section, and a third continuous braking control section.

The control section determination unit 320 may determine a continuous braking control section based on whether the brake pedal is operating and vehicle driving speed.

For example, when the continuous braking initiation determination unit 200 determines to initiate continuous braking (when the brake pedal is in operation, and the driving speed is less than a first reference speed), the control section determination unit 320 may be determined as a first continuous braking control section.

In addition, when the brake pedal is in operation and the driving speed is less than a preset second reference speed (for example, 6 km/h), the control section determination unit 320 may determine to change the continuous braking control section from the first continuous braking control section to a second continuous braking control section (S802).

In addition, when the brake pedal is in operation and the driving speed is less than a preset third reference speed (for example, 5 km/h), the control section determination unit 320 may determine to change the continuous braking control section from the second continuous braking control section to a third continuous braking control section (S804).

In addition, when the brake pedal is in operation and the driving speed is less than a preset fourth reference speed (for example, 3 km/h), the control mode determination unit 310 may determine to change the continuous braking control mode from a first continuous braking control mode to a second continuous braking control mode (S806).

In S802, S804, and S806, when the brake pedal is not in operation or vehicle driving speed is not satisfied, the continuous braking control unit 300 may stop continuous braking control, and may return to S700 to determine again whether to initiate the continuous braking control.

Hereinafter, with reference to FIGS. 5 to 7, a method of generating braking force in the first to third continuous braking control sections will be described in more detail.

Figure 5:
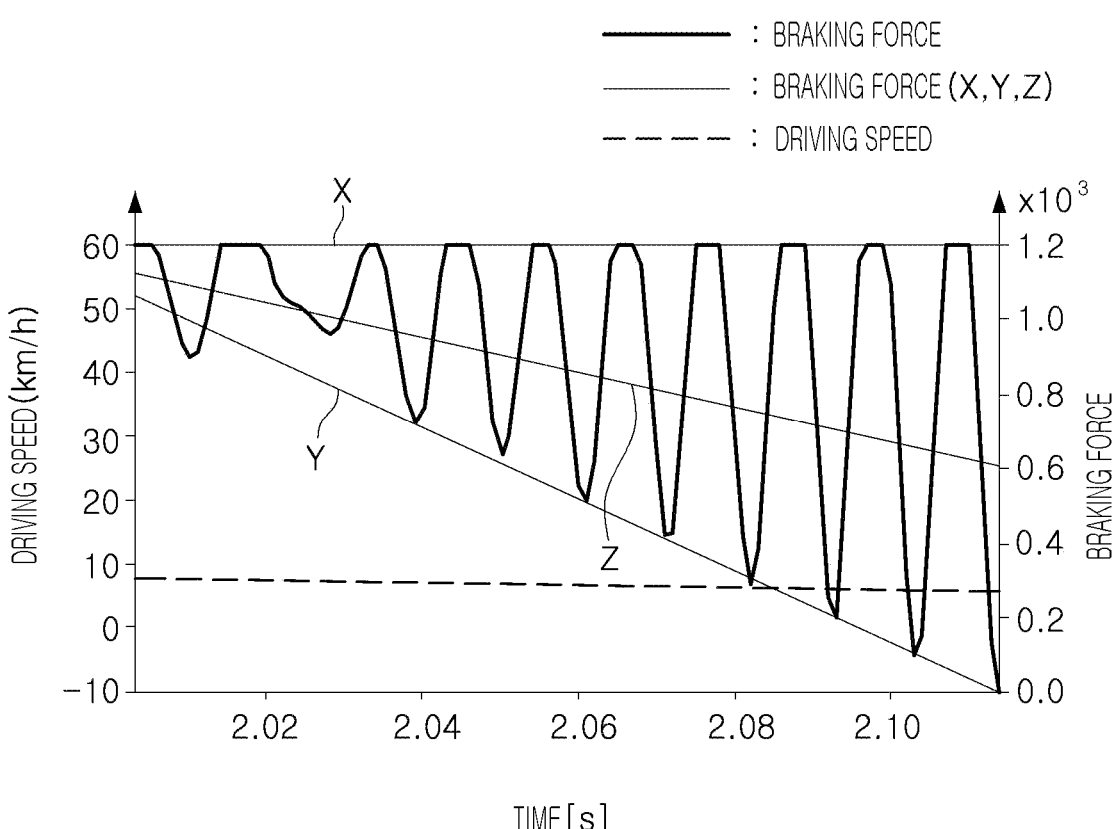
FIG. 5 is a graph illustrating a first continuous braking control section according to an embodiment of the present disclosure.
Figure 6:
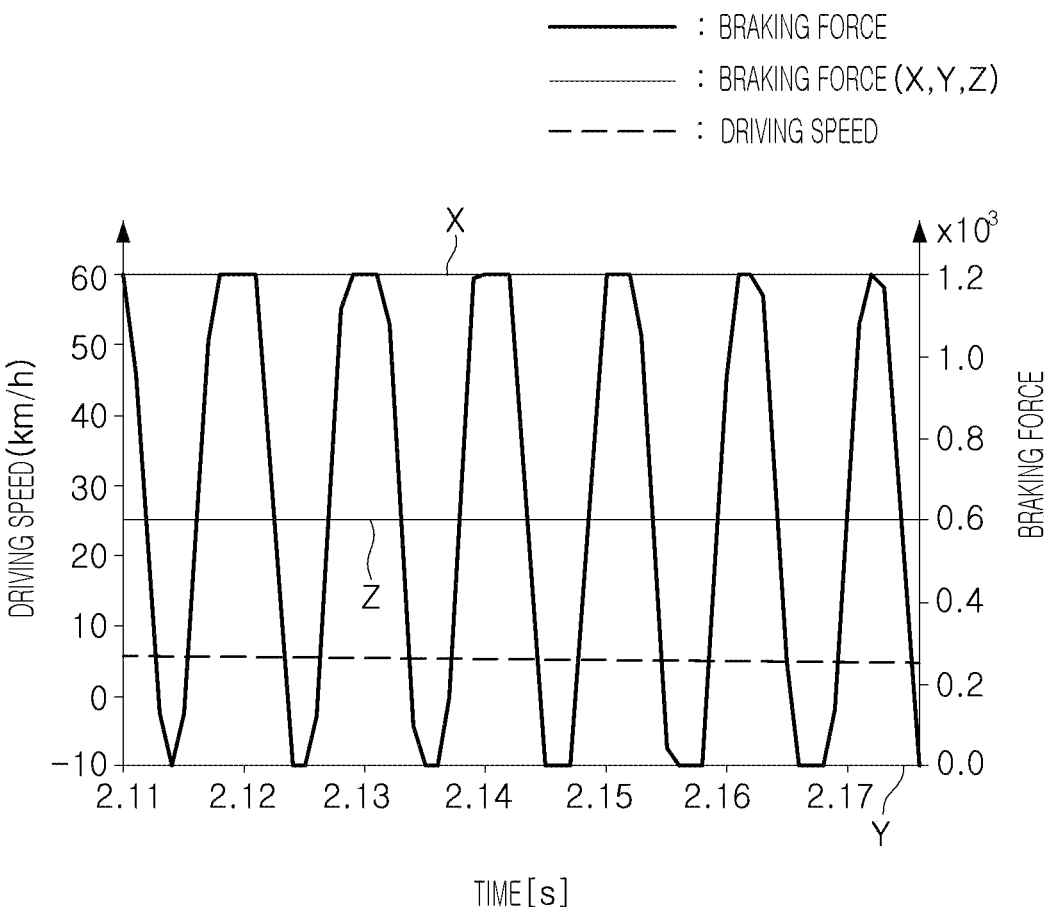
FIG. 6 is a graph illustrating a second continuous braking control section according to an embodiment of the present disclosure.
Figure 7:
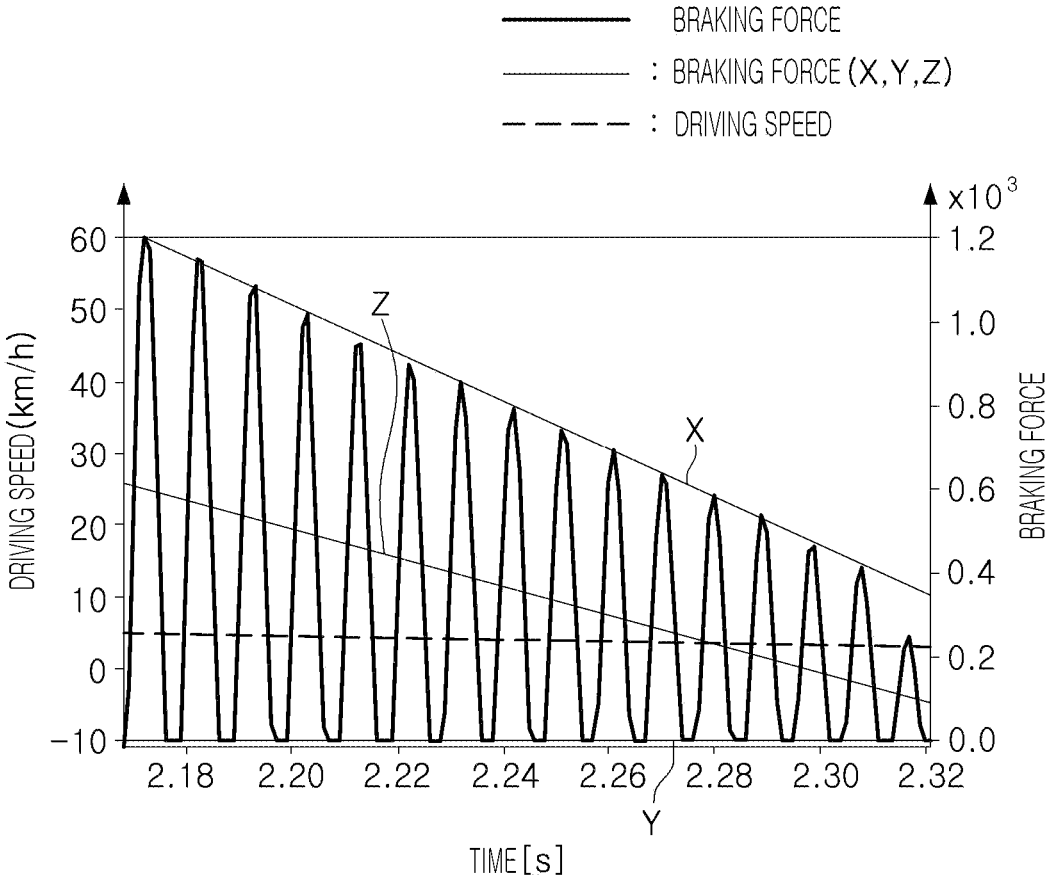
FIG. 7 is a graph illustrating a third continuous braking control section according to an embodiment of the present disclosure.

FIG. 5 is a graph illustrating a first continuous braking control section according to an embodiment of the present disclosure, FIG. 6 is a graph illustrating a second continuous braking control section according to an embodiment of the present disclosure, and FIG. 7 is a graph illustrating a third continuous braking control section according to an embodiment of the present disclosure.

Referring to FIG. 5, the first continuous braking control section may be an operation of adjusting the braking force so as to maintain a first braking force (X) and reduce a third braking force (Z).

Here, in the case of periodically changing the braking force, a first braking force (X) may mean the highest braking force in one cycle, and a second braking force (Y) may mean the lowest braking force in one cycle.

Here, the first braking force (X) in the first continuous braking control section may be braking force to satisfy required deceleration received through the receiving unit 100.

In addition, the first braking force (X) in the first continuous braking control section may be braking force that can satisfy required deceleration determined by a pedal stroke or pedal force of a brake pedal received through the receiving unit 100.

Here, the braking force to satisfy the required deceleration of the vehicle may be referred to as required braking force.

When the braking force (or required braking force) is determined according to the required deceleration, a braking apparatus according to the prior art can consistently generate the determined braking force.

Meanwhile, the continuous braking control unit 300 according to an embodiment of the present disclosure may repeatedly increase or decrease braking force. In other words, the continuous braking control unit 300 according to an embodiment of the present disclosure may change the braking force periodically.

More specifically, in the first continuous braking control section, the continuous braking control unit 300 may control the braking force control unit to maintain the first braking force (X) to be constant, but reduce the second braking force (Y) as a braking time increases.

Here, the first braking force (X) in the first continuous braking control section may be required braking force.

In other words, in the first continuous braking control section, the continuous braking control unit 300 may generate braking force to maintain the first braking force (X) to be constant, and to gradually increase an amplitude of the braking force depending on a braking time.

Accordingly, in the first continuous braking control section, a magnitude of third braking force (Z) may gradually decrease. Here, the third braking force (Z) may be average braking force.

Referring to FIG. 6, in the second continuous braking control section, the continuous braking control unit 300 may repeatedly increase or decrease braking force. However, the continuous braking control unit 300 may repeatedly adjust the braking force with the same amplitude, unlike in the first continuous braking control section.

In other words, in the second continuous braking control section, the continuous braking control unit 300 can repeatedly generate a first braking force (X) and a second braking force (Y).

Here, the second braking force (Y) may be a preset value. Referring to FIG. 6, the second braking force (Y) may be 0 (zero)', but the present disclosure is not limited thereto.

Accordingly, in the second continuous braking control section, the magnitude of the third braking force (Z) can be maintained approximately to be constant.

The required braking torque may be braking torque transmitted from a brake pedal operated by a driver.

Referring to FIG. 7, the third continuous braking control section may be an operation of adjusting braking force to reduce third braking force (Z) while maintaining second braking force (Y).

Here, in an embodiment of the present disclosure, the second braking force (Y) may be a preset braking force value, which is set to 0 (zero), but the present disclosure is not limited thereto, and various values, lower than the first braking force (X) may be applied.

More specifically, in the third continuous braking control section, the continuous braking control unit 300 may control braking force control unit, to maintain the second braking force (Y) to be constant, but reduce the first braking force (X) as a braking time increases.

In other words, in the third continuous braking control section, the continuous braking control unit 300 may maintain the second braking force (Y) to be constant, and generate braking force so that the amplitude of the braking force gradually decreases depending on the braking time.

Accordingly, in the third continuous braking control section, the magnitude of the third braking force (Z) may gradually decrease.

While driving in the first continuous braking control mode, when the driving speed is less than a preset fourth reference speed (e.g., 3 kph), and a driver is operating the brake pedal, the continuous braking control unit 300 may perform a second continuous braking control mode (S900).

Referring to FIG. 4, again, the second continuous braking control mode may include an $A^{th}$ continuous braking control section and a $B^{th}$ continuous braking control section.

When the brake pedal is in operation and the driving speed is lower than a preset fourth reference speed (for example, 3 kph), the control mode determination unit 310 may be determined as an $A^{th}$ continuous braking control section.

In addition, when the brake pedal is in operation and the driving speed is lower ess than a preset fifth reference speed (for example, 1 kph), the control section determination unit 320 may determine to change the continuous braking control section from the $A^{th}$ continuous braking control section to a $B^{th}$ continuous braking control section (S902).

In addition, the continuous braking control unit 300 may brake in the $B^{th}$ continuous braking control section until the vehicle stops (S903).

In S902, when the brake pedal is not in operation, or vehicle driving speed is higher than a fifth reference speed, the continuous braking control unit 300 may stop continuous braking control, and return to S700 to determine again whether to initiate the continuous braking control (S902).

Hereinafter, with reference to FIGS. 8 and 9, in the $A^{th}$ continuous braking control section and the B continuous braking control section, a method in which the continuous braking control unit 300 generates braking force using the braking force generating unit 400 will be described in more detail.

Figure 8:
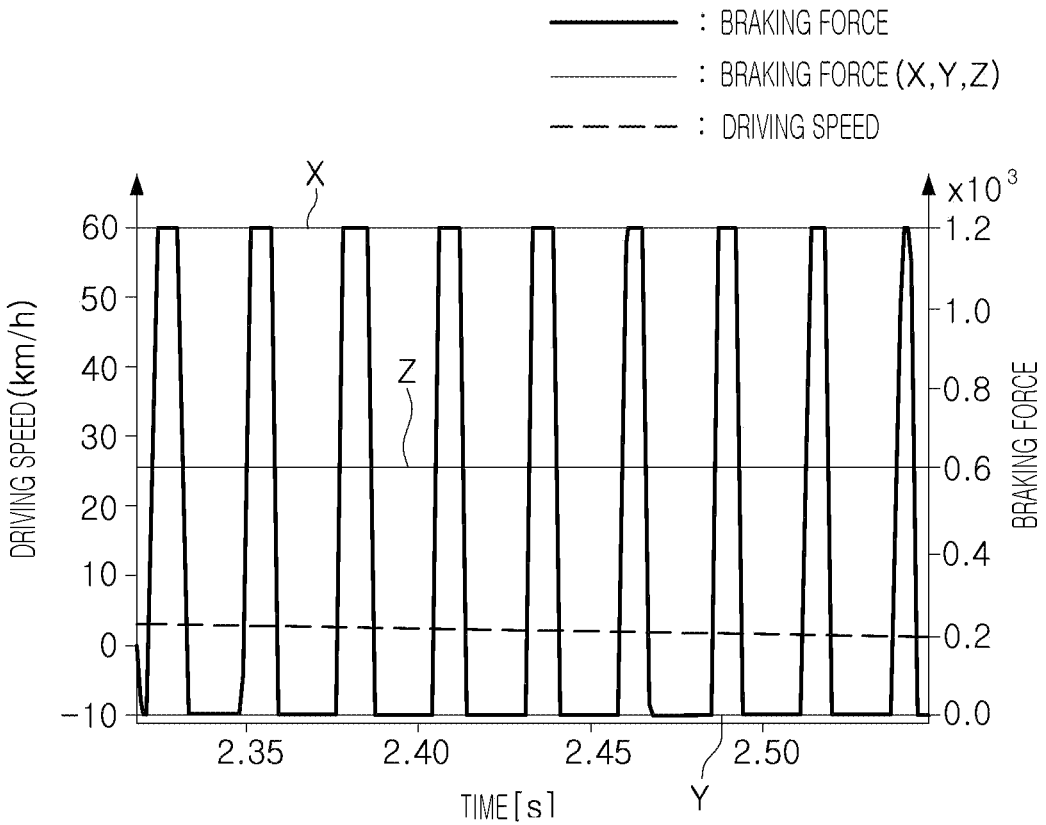
FIG. 8 is a graph showing an $A^{th}$ continuous braking control section according to an embodiment of the present disclosure.
Figure 9:
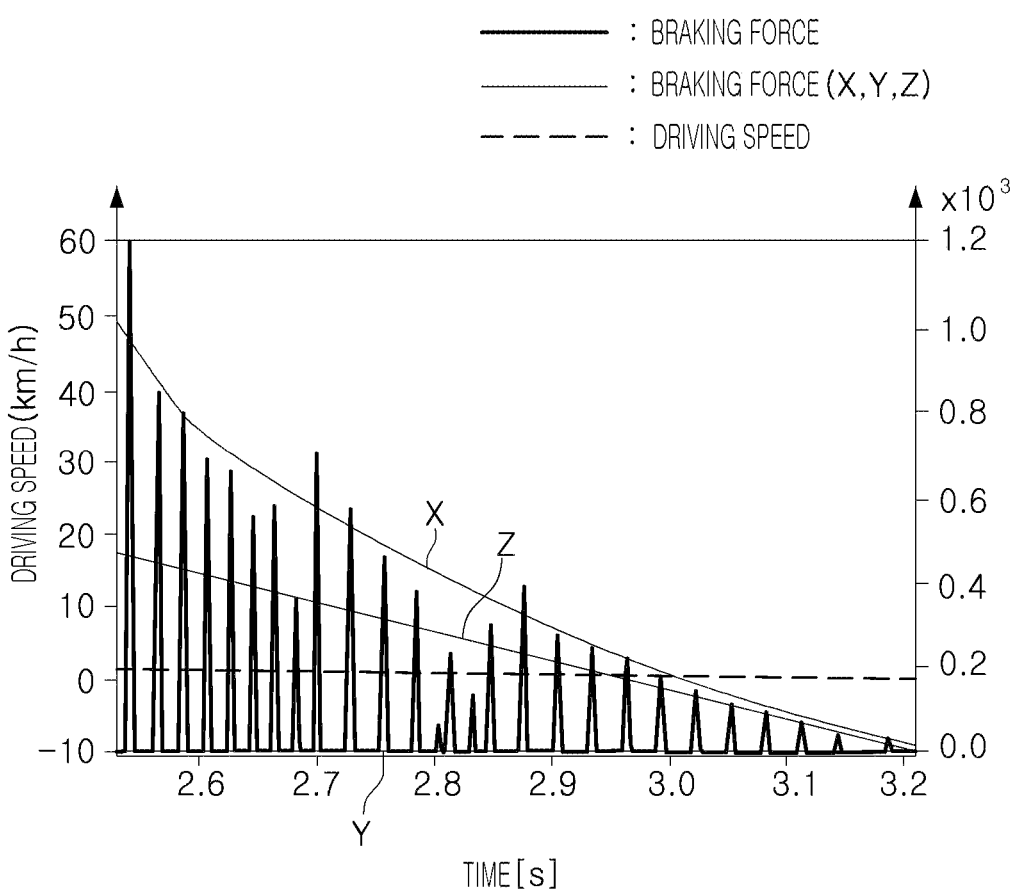
FIG. 9 is a graph illustrating a $B^{th}$ continuous braking control section according to an embodiment of the present disclosure.

FIG. 8 is a graph illustrating an $A^{th}$ continuous braking control section according to an embodiment of the present disclosure, and FIG. 9 is a graph illustrating a $B^{th}$ continuous braking control section according to an embodiment of the present disclosure.

Referring to FIG. 8, in the $A^{th}$ continuous braking control section, the continuous braking control unit 300 may repeatedly increase or decrease braking force. The continuous braking control unit 300 may repeatedly adjust the braking force so that the change range of the braking force is the same.

In other words, in the $A^{th}$ continuous braking control section, the continuous braking control unit 300 may repeatedly generate the first braking force (X) and the second braking force (Y). Here, the second braking force (Y) may be a preset value. Referring to FIG. 6, the second braking force (Y) may be '0 (zero)', but the present disclosure is not limited thereto.

Therefore, in the $A^{th}$ continuous braking control section, the magnitude of the third braking force (Z) can be maintained to be approximately constant.

Referring to FIG. 8, the $B^{th}$ continuous braking control section may be an operation of adjusting the braking force to maintain the second braking force (Y) and reduce the third braking force (Z).

Here, the second braking force (Y) is a preset braking force value, and in an embodiment of the present disclosure, the preset braking force value may be 0 km/h, but the present disclosure is not limited thereto, and various values, lower than the first braking force (X) may be applied.

More specifically, in the $B^{th}$ continuous braking control section, the continuous braking control unit 300 may control the braking force control unit, to maintain the second braking force (Y) to be constant, but to decrease the first braking force (X) as a braking time increases.

In other words, in the $B^{th}$ continuous braking control section, the continuous braking control unit 300 may keep the second braking force (Y) to be constant, and generate braking force so that the amplitude of the braking force gradually decreases depending on the braking time to stop the vehicle.

Accordingly, in the $B^{th}$ continuous braking control section, the magnitude of the third braking force (Z) may gradually decrease.

In the braking apparatus according to the prior art, in a process of stopping a vehicle, by maintaining the braking force of the vehicle to be constant, a section in which vehicle speed rapidly changes occurs at the moment the vehicle stops, which may cause an impact occurring when a vehicle is stopped due to inertial force.

In particular, some conventional braking apparatuses generate braking force of the vehicle by sequentially reducing braking force of the vehicle according to a braking section. However, when the braking force of the vehicle is sequentially reduced according to the braking section, the amplitude of a change in the vehicle speed decreases, but it does not completely eliminate an impact occurring when a vehicle is stopped that essentially occurs at the moment of stopping.

Meanwhile, according to an embodiment of the present disclosure, by linearly changing the braking force and stopping the vehicle, it is possible to minimize the stopping shock that may occur in the vehicle at the moment the vehicle is stopped.

Referring again to FIG. 2, in a process of decelerating to the $B^{th}$ continuous braking control section, the continuous braking control unit 300 can check whether the vehicle is stopped. For example, the continuous braking control unit 300 can check whether vehicle driving speed is 0 kph (S1000).

When vehicle driving speed is 0 kph, the continuous braking control unit 300 may determine that the vehicle is stopped and terminate control.

In addition, when vehicle driving speed is not 0 kph, the continuous braking unit may return to step S902. In other words, when vehicle driving speed is not 0 kph, the continuous braking brake unit may determine whether to continue control in the $B^{th}$ continuous braking control section and can brake in the $B^{th}$ continuous braking control section (S902 and S903).

Figure 10:
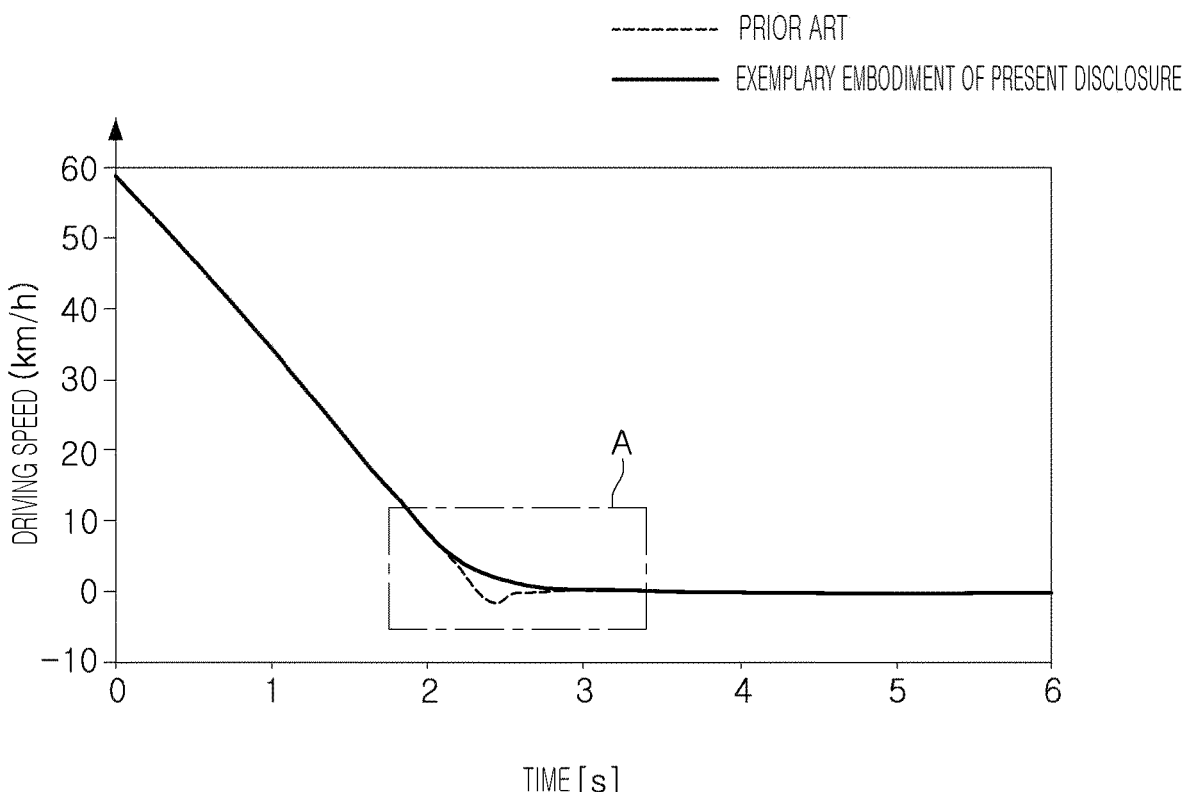
FIG. 10 is a graph illustrating vehicle driving speed according to an embodiment of the present disclosure and the prior art.
Figure 11:
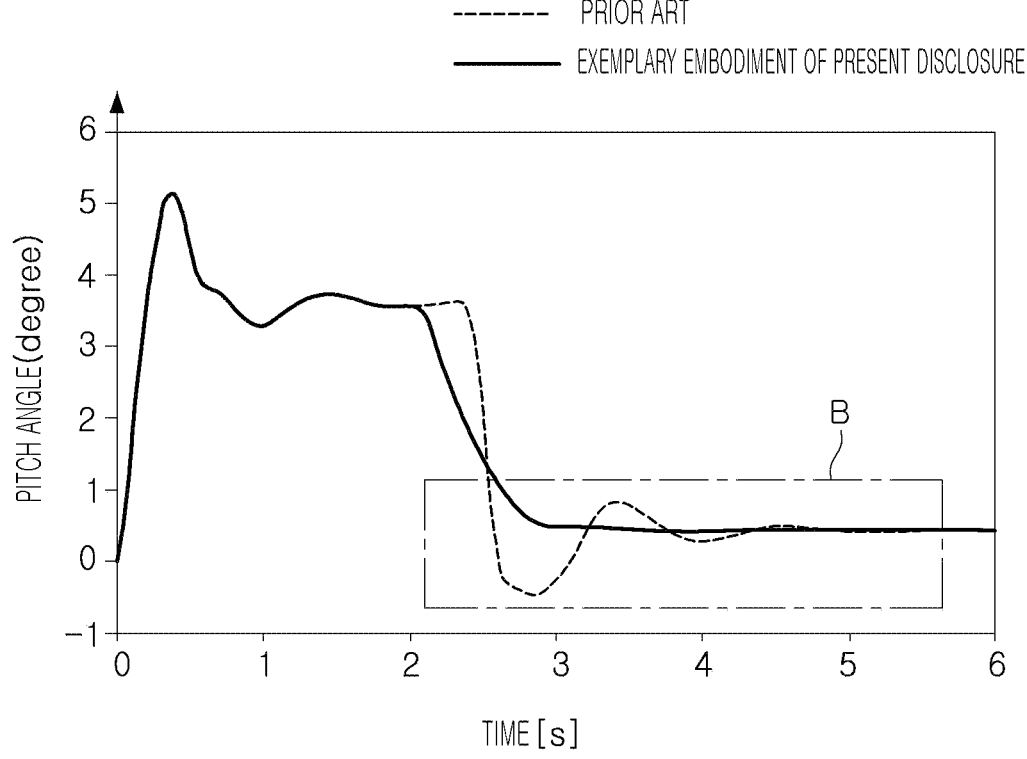
FIG. 11 is a graph illustrating a pitch angle of a vehicle according to an embodiment of the present disclosure and the prior art.

FIG. 10 is a graph illustrating a vehicle driving speed according to an embodiment of the present disclosure and the prior art, and FIG. 11 is a graph illustrating a pitch angle of a vehicle according to an embodiment of the present disclosure and the prior art.

Referring to FIG. 10, in a vehicle using a braking apparatus according to the prior art, an impact occurring when a vehicle is stopped may occur due to an acceleration difference due to a change in speed at the moment at which vehicle driving speed is 0 (zero) kph.

In particular, referring to an A box section, in a vehicle using a braking apparatus according to the prior art, when the vehicle is stopped, the vehicle moves back and forth due to the stopping shock due to inertial force, so that a section in which the vehicle speed in some sections is 0 (zero) kph or less, occurs.

In addition, referring to a B box section of FIG. 11, at the moment at which vehicle driving speed is 0 (zero) kph, a pitch of the vehicle occurs 0 (zero) or less, due to the acceleration difference due to the change in speed, fluctuations occur, and a feeling of stopping the vehicle may be greatly reduced.

Meanwhile, referring again to the A box section of FIG. 10, in a vehicle using a braking apparatus according to an embodiment of the present disclosure, in a vehicle using a braking apparatus according to an embodiment of the present disclosure, at the moment at which vehicle driving speed is 0 (zero) kph, the change in vehicle driving speed may be continuously and smoothly alleviated.

In addition, referring to the B box section of FIG. 11, in a vehicle using a braking apparatus according to an embodiment of the present disclosure, at the moment at which vehicle driving speed is 0 (zero) kph, it can be confirmed that the pitch angle due to the change in speed also smoothly changes without any fluctuations.

In other words, as the braking apparatus according to an embodiment of the present disclosure changes the braking force of the vehicle and brakes, the braking apparatus may smoothly change vehicle driving speed and stop the vehicle, and minimize an impact occurring when a vehicle is stopped.

The braking apparatus and braking method according to an embodiment of the present disclosure may help the vehicle stop smoothly by minimizing the impact occurring when a vehicle is stopped by controlling the braking force of the vehicle to have a waveform with periodicity.

In addition, the braking apparatus and braking method according to an embodiment of the present disclosure may minimize the stopping impact, occurring in a vehicle, by changing a method of controlling the braking force based on vehicle driving speed.

The methods according to the present disclosure may be implemented in a form of program instructions that can be executed by various computer means and recorded on a computer readable medium. The computer readable medium may include program instructions, data files, data structures, and the like, alone or in a combination thereof. Program instructions recorded on a computer readable medium may be specially designed and configured for the present disclosure may be known to those skilled in computer software and used. Examples of the computer readable medium include hardware devices specially configured to store and execute program instructions, such as ROM, RAM, flash memory, and the like.

Examples of the computer readable medium include hardware devices specially configured to store and execute program instructions, such as ROM, RAM, flash memory, and the like. Examples of the program instructions include high-level language codes that can be executed by a computer using an interpreter, or the like as well as machine language codes generated by a compiler. The hardware device described above may be configured to operate with at least one software module to perform the operations of the present disclosure, and vice versa.

As set forth above, in a braking apparatus and a braking method according to an embodiment of the present disclosure, by periodically changing and braking a magnitude braking force of the vehicle, and causing the driving speed due to braking to continuously change, so that an impact occurring when a vehicle is stopped may be minimized.

In the braking apparatus and braking method according to an embodiment of the present disclosure, an impact occurring when a vehicle is stopped may be minimized.

While the example embodiments have been illustrated and described above, it will be apparent to those skilled in the art that modifications and variations could be made without departing from the scope of the present disclosure as defined by the appended claims.

What is claimed is:

1. A braking apparatus for a vehicle, comprising:

a receiving unit configured to receive driving information of the vehicle;

a braking force generating unit configured to generate a waveform braking force of the vehicle; and a continuous braking control unit configured to control the braking force generating unit to adjust a magnitude of the braking force based on the driving information, wherein the continuous braking control unit is configured to control the braking force generating unit so as to periodically generate the braking force with the magnitude of between a first braking force and a second braking force, and the braking force is controlled so that a driving speed of the vehicle changes continuously, wherein the continuous braking control unit comprises a first continuous braking control mode configured to brake the vehicle to reduce a vehicle speed to a preset speed based on a driving speed of the vehicle and a second continuous braking control mode configured to brake the vehicle to stop the vehicle, and wherein the first continuous braking control mode and the second continuous braking control mode comprise determining a plurality of continuous braking control sections divided based on the driving speed of the vehicle.

2. The braking apparatus of claim 1, wherein the first braking force corresponds to a highest braking force value within one cycle, and the second braking force corresponds to a lowest braking force value within the one cycle.

3. The braking apparatus of claim 1, wherein the driving information comprises at least one of a driving speed of the vehicle or brake pedal stroke information.

4. The braking apparatus of claim 1, wherein based on the driving information, a continuous braking initiation determination unit is configured to determine whether the continuous braking control unit initiates continuous braking.

5. The braking apparatus of claim 4, wherein in the continuous braking initiation determination unit, when a driving speed of the vehicle is lower than a preset first reference speed and a brake pedal is in operation, the continuous braking control unit controls the braking force generating unit.

6. The braking apparatus of claim 1, wherein in at least one continuous braking control section of the plurality of continuous braking control sections, the continuous braking control unit controls the braking force generating unit to maintain the first braking force in each cycle to be constant, but to gradually reduce the second braking force in each cycle.

7. The braking apparatus of claim 1, wherein in another continuous braking control section of the plurality of continuous braking control sections, the continuous braking control unit controls the braking force generating unit to maintain the first braking force and the second braking force in each cycle to be constant.

8. The braking apparatus of claim 1, wherein in another continuous braking control section of the plurality of continuous braking control sections, the continuous braking control unit controls the braking force generating unit to maintain the second braking force in each cycle to be constant, but to gradually reduce the first braking force in each cycle.

9. A vehicle comprising the braking apparatus of claim 1.

10. A braking method of a vehicle, the braking method comprising the steps of:

receiving, by a receiving unit of a braking apparatus, driving information of the vehicle;

determining, by a continuous braking control unit of the braking apparatus, whether to initiate continuous braking control based on the driving information; and performing, by the continuous braking control unit, continuous braking control by adjusting a waveform braking force of the vehicle, wherein the step of performing continuous braking control includes adjusting the braking force so that a driving speed of the vehicle changes continuously until the vehicle stops, wherein the continuous braking control unit comprises a first continuous braking control mode configured to brake the vehicle to reduce a vehicle speed to a preset speed based on the driving speed of the vehicle and a second continuous braking control mode configured to brake the vehicle to stop the vehicle, and wherein the first continuous braking control mode and the second continuous braking control mode comprise determining a plurality of continuous braking control sections divided based on the driving speed of the vehicle.

11. The braking method of claim 10, wherein in the step of determining whether to initiate continuous braking control, when the driving speed of the vehicle is lower than a preset speed, the continuous braking control is initiated.

12. The braking method of claim 10, wherein in the step of performing continuous braking control, the braking force periodically generates a first braking force and a second braking force.

13. The braking method of claim 12, wherein the first braking force corresponds to a highest braking force within one cycle, and the second braking force corresponds to a lowest braking value within the one cycle.

14. The braking method of claim 12, wherein the step of performing continuous braking control comprises determining at least one continuous braking control section, and a waveform formed by the braking force is changed according to the continuous braking control section.

15. The braking method of claim 14, wherein in the at least one continuous braking control section, the step of performing continuous braking control generates the braking force to maintain the first braking force to be constant, but to gradually increase an amplitude of the waveform.

16. The braking method of claim 14, wherein in the at least one continuous braking control section, the step of performing continuous braking control generates the braking force to maintain an amplitude of the waveform to be constant.

17. The braking method of claim 14, wherein in the at least one continuous braking control section, the step of performing continuous braking control generates the braking force to maintain the second braking force to be constant, but to gradually reduce an amplitude of the waveform.

* * * * *